United States Patent Office 3,832,341
Patented Aug. 27, 1974

3,832,341
PURINE NUCLEOSIDE NITRATES
Robert Duschinsky, Pully, Switzerland, assignor to Hoffmann-La Roche Inc., Nutley, N.J.
No Drawing. Filed May 4, 1972, Ser. No. 250,218
Claims priority, application Switzerland, Sept. 10, 1971, 13,298/71
Int. Cl. C07d 51/54
U.S. Cl. 260—211.5 R        14 Claims

ABSTRACT OF THE DISCLOSURE

Purine nucleoside nitrate derivatives and a process for the manufacture thereof are described. The purine nucleoside nitrates are cardiac agents.

BRIEF DESCRIPTION OF THE INVENTION

The purine nucleoside derivatives of the present invention have the following general formula

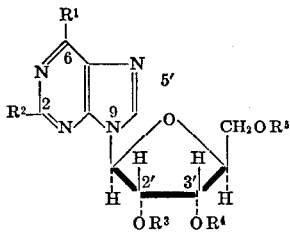

I wherein $R^1$ is a hydroxy or amino group, $R^2$ is a hydrogen atom or an amino group, $R^3$ is a hydrogen atom or a nitro group, $R^4$ is a hydrogen atom or a nitro or phosphono group and $R^5$ is a hydrogen atom or a nitro or phosphono group, provided that at least one of $R^3$, $R^4$ and $R^5$ represents a nitro group.

Preferred purine nucleoside derivatives of formula I are those of the general formulae:

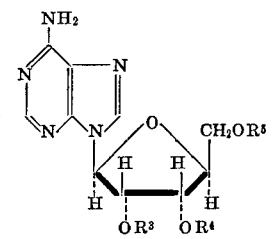

Ia

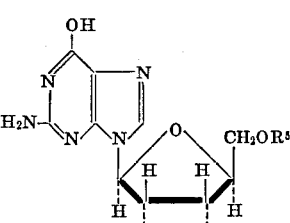

Ib

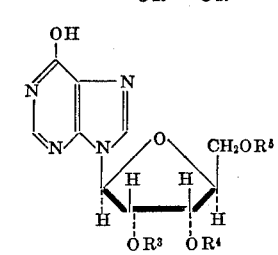

Ic wherein $R^3$, $R^4$ and $R^5$ are as above provided that one of these symbols represents a nitro group.

According to the process aspect of the present invention, the purine nucleoside derivatives of formula I are prepared by reacting a corresponding non-nitrated purine nucleoside or purine nucleotide carrying at least one free hydroxyl group in the sugar moiety with fuming nitric acid.

In order to reduce or eliminate the possibility of a hydrolysis (brought about by water being formed in the reaction mixture) or a deamination (brought about by nitrous acid possibly being present) taking place, it is advisable to carry out the reaction in the presence of a water-binding agent such as acetic anhydride and/or a nitrite scavenger such as urea.

The reaction is preferably carried out at a temperature in the range of about $-30°$ C. to $25°$ C., especially in the range betwen about $0°$ C. to $20°$ C. A preferred embodiment of the present process comprises commencing the reaction at a low temperature, then bringing the reaction mixture to about $0°$ C., holding the reaction mixture at this temperature for some time if desired and/or then, if desired, holding the reaction mixture at room temperature for a further interval of time. The reaction can be carried out for a period of from about 30 minutes up to several hours, preferably from 1 to 2 hours.

The working up of the reaction mixture and the isolation of the desired product can be carried out according to methods which are generally known; for example, using chromatographic procedures. Depending on the work-up, the products can contain fractions of bound solvents (e.g., water or alcohol). In other words, they can be present, for example, as hydrates or alcoholates.

The purine nucleoside derivatives of formula I hereinbefore, especially those of formulae Ia, Ib and Ic, are valuable pharmacologically active substances. They promote the blood flow of the myocardium and of the coronary vessels. This can be shown, for example, by circulatory-dynamic investigations on thoractomised, artificially respirated cats in Numal narcosis. In contrast to known compounds having similar pharmacological activity (e.g., adenosine 5'-phosphate), adenosine 5'-nitrate, for example, is quantitatively clearly superior and also possesses a greater therapeutic breadth. Also the purine nucleoside derivatives of formula I have an advantageous duration of activity compared with known compounds.

The purine nucleoside derivatives of formula I can be used as medicaments; for example, in the form of pharmaceutical preparations which contain them in associated with a compatible pharmaceutical carrier. This carrier may be an organic or inorganic carrier suitable for enteral or parenteral administration such as, for example, water, gelatin, gum arabic, lactose, starch, magnesium stearate, talc, vegetable oils, polyalkyleneglycols, petroleum jelly and the like. The pharmaceutical preparations can be made up in solid forms (e.g., tablets, dragées, suppositories or capsules), in semi-solid form (e.g., salves) or in liquid forms (e.g., solutions, suspensions or emulsions). The pharmaceutical preparations may be sterilized and/or may contain adjuvants such as preserving agents, stabilizing agents, wetting agents, emulsifying agents, salts for varying the osmotic pressure or buffers. The pharmaceutical preparations may also contain other therapeutically valuable substances.

When used as cardiac agents herein compounds of formula I may be administered in single or divided daily dosages of from about 0.01 mg./kg. to about 10 mg./kg. It is understood that these dosage ranges are subject to variation based on the medical judgment of the administering party and must not be considered to be narrowly critical to the practice of the present invention. Generally, the compounds of this invention may be employed as therapeutic agents in enteral dosage forms containing from about 1 to 20 mg. of the compounds of formula I whereas parenteral dosage forms will contain desirably from about 0.1 to 10 mg. of the active compounds (or in both cases an amount of the hydrated or alcoholated compound equivalent thereto).

The following Examples serve to further illustrate the present invention:

EXAMPLE 1

A solution of 4 g. of urea in 30 ml. of fuming nitric acid ($d=1.52$), cooled to $-30°$ C., was treated while stirring with 15 ml. of acetic anhydride and then with 12 g. of adenosine. The mixture was brought to 0° C., held at this temperature for 1 hour and then warmed to 25° C. over the course of 30 minutes. The clear solution was poured while stirring into a mixture of 84 g. of sodium bicarbonate and 600 g. of ice/water. The resulting mixture was stirred for 1 hour and kept overnight in a refrigerator. The white crystals which precipitated were filtered off, washed with ice-cold water, and with some ethanol and ether, and then dried at 50° C. under reduced pressure. 6.25 g. of a mixture of adenosine mononitrate and adenosine dinitrate of melting point 165–170° C. (decomposition) were obtained. Treatment of this mixture with 100 ml. of boiling water yielded 2.33 g. of adenosine 3',5'-dinitrate as a residue; melting point 185° C. (decomposition). After recrystallization from isopropanol, the melting point was 189° C. (decomposition); U.V. (in 1-N hydrochloric acid): $\lambda_{max}$. 256 nm. ($\epsilon=13800$); $[\alpha]_D^{25}=-25°$ (c.$=1.1\%$ in dimethyl sulphoxide).

EXAMPLE 2

The solution obtained by treating the 6.25 g. of the mixture of adenosine mononitrate and adenosine dinitrate prepared as described in Example 1 with 100 ml. of boiling water was exhaustively extracted with ethyl acetate. 4.57 g. of adenosine 5'-nitrate monohydrate were isolated from the extract, the melting point of which after recrystallization from 20 parts by volume of water was 115–117°. U.V. (in 0.1-N hydrochloric acid): $\lambda_{max}$. 256 nm. ($\epsilon=15600$); $[\alpha]_D^{25}=-16°$ (c.$=0.25\%$ in water).

The mother liquor of the 2.33 g. of adenosine 3',5'-dinitrate obtained as described in Example 1 gave upon cooling 2.02 g. of additional adenosine 5'-nitrate monohydrate.

EXAMPLE 3

In an experiment carried out according to the procedure described in Example 1 in which the duration of the reaction between adenosine and fuming nitric acid at room temperature was extended to 1.5 hours, in addition to crude adenosine 3',5'-dinitrate there could be detected by thin-layer chromatography adenosine 2',3',5'-trinitrate which could be obtained by recrystallization of the crude adenosine 3',5'-dinitrate from isopropanol, concentration of the mother liquor and addition of pentane; melting point 145°–146° C. (from ethanol); yield from 1.35 g. of adenosine$=117$ mg.

EXAMPLE 4

11.73 g. of adenosine 5'-phosphate disodium salt (dried at 100° C. under reduced pressure) were added to a solution of 0.6 g. of urea and 2.5 ml. of acetic anhydride in 29 ml. of fuming nitric acid and cooled to $-20°$ C. The temperature was brought to 20° C. over the course of 1.5 hours until an almost clear solution was obtained. This solution was brought to pH 4 by treatment with 120 g. of ice/water and 60 g. of sodium bicarbonate. The resulting mixture was concentrated under reduced pressure at a bath temperature of 40° C. up to incipient crystallization and chromatographed over an anion-exchange column (2.5 x 90 cm.), AG 1–X8 (acetate form, 100–200 mesh), at an elution rate of 82 ml./h. The receiver was changed every 12 minutes. Elution was carried out with water to fraction 102, with 15% acetic acid to fraction 227 and with 25% acetic acid to fraction 280. Fractions 33–80 and 121–142 were combined, brought to dryness under reduced pressure and the residue was dissolved in 12 ml. of warm water (50° C.). After the addition of 12 ml. of ethanol, there crystallized in the cold adenosine 3'-nitrate 5'-phosphate which was filtered off and washed with 50% ethanol, absolute ethanol and ether. Melting point 216° C. (decomposition); yield 2.17 g.; U.V. (in 0.1 N hydrochloric acid); $\lambda_{max}$. 257 nm. ($\epsilon=13400$), $\lambda_{min}$. 229 nm. ($\epsilon=3630$); U.V. (in 0.1-N potassium hydroxide); $\lambda_{max}$. 259 nm. ($\epsilon=14250$), $\lambda_{min}$. 229 ($\epsilon=3960$).

EXAMPLE 5

0.73 g. of adenosine 3'-phosphate were treated for a period of 45 minutes at a temperature of 20° C. with a solution of 100 mg. of urea and 0.5 ml. of acetic anhydride in 2 ml. of fuming nitric acid. By the addition of 20 g. of ice and sodium bicarbonate there was obtained a solution of pH 4 which was concentrated under reduced pressure to 10 ml. and then chromatographed on an anion-exchange column (1.5 x 90 cm.), AG 1–X8 (acetate form) at an elution rate of 82 ml./h. The receiver was changed every 12 minutes. Elution was carried out with water up to fraction 30 and then with a gradient of water and 25% acetic acid.

Fractions 50–83 were concentrated together to 2 ml. and treated with 10 ml. of ethanol. There were obtained 120 mg. of an adenosine 3'-phosphate-2'- and/or -5'-mononitrate of melting point 168° C. (decomposition) which, on the basis of analysis, still contained 0.75 mol of water and 0.25 mol of ethanol; U.V. (in 0.1-N hydrochloric acid): $\lambda_{max}$. 257 nm. ($\epsilon=14400$).

From fractions 115–170 there could be isolated by crystallization from 5 ml. of water and 10 ml. of ethanol 217 mg. of adenosine 2',5'-dinitrate 3'-phosphate which, on the basis of analysis, still contained 0.5 mol. of water and 0.1 mol. of ethanol. Melting point$=185°$ C. (decomposition): U.V. (in 0.1-N hydrochloric acid): $\lambda_{max}$. 258 nm. ($\epsilon=15100$).

EXAMPLE 6

1 g. of guanosine (dried under reduced pressure at 100° C.) was reacted with a solution of 10 ml. of fuming nitric acid, 1.5 g. of urea and 3 ml. of acetic anhydride in the manner described in the previous Examples. The mixture was held at $-10°$ C. for 1 hour, then for 10 minutes at 0° C. and subsequently poured into a mixture of 100 g. of ice/water and sufficient sodium bicarbonate so that the resulting mixture had a pH value of 3. The mixture was kept overnight in a refrigerator, filtered and washed with ice-cold water, ethanol and ether to yield 1.1 g. of a crystalline material consisting of guanosine, guanosine mononitrate and guanosine dinitrate which could not be resolved by recrystallization.

755 mg. of this crystalline material were dissolved in 20 ml. of 50 volume percent ethanol and fractionated by means of gradient elution (water/20 percent acetic acid) on an ion-exchange column (1.5 x 60 cm.) AG 1–X8, at an elution rate of 82 ml/h. The receiver was changed every 12 minutes.

The individual fractions were investigated by paper chromatography and U.V.-spectrophotometry. After concentration to dryness and crystallization from 5 ml. of water, the fractions of the second peak yielded 131 mg. of a mixture which contained 70 percent of guanosine 5'-nitrate and 30 percent of guanosine 2'-nitrate and/or guanosine 3'-nitrate; $\lambda_{max}$. (in 0.1-N hydrochloric acid) 257 nm. ($\epsilon=11900$); $\lambda_{max}$. (in 1-N sodium hydroxide) 263 nm. ($\epsilon=11000$).

Crystallization of the fractions of the third peak yielded 186 mg. of guanosine 3',5'-dinitrate which had no definite melting point and decomposed at about 200° C.

EXAMPLE 7

6 g. of inosine were reacted for 1.5 hours with stirring and cooling to 0° C. with 25 ml. of fuming nitric acid. The resulting solution was poured into 400 g. of ice/ water and the mixture was adjusted to pH 3 with sodium bicarbonate. The solution was kept in a refrigerator. The crystals which had precipitated were filtered off washed with water and little aqueous ethanol and ether to yield 5.376 g., m.p. 164° C. The filtrate was exhaustively extracted with ethyl acetate. Upon evaporation there were obtained 2.7 g. of a crude product which was then dissolved in 13 ml. of boiling ethanol. 100 ml. of water were added to the filtered solution. The solution was kept in the refrigerator and then the crystals which had precipitated were filtered off and washed with 12 percent aqueous ethanol, with ethanol/ether and finally with ether to give a yield of 1.575 g., m.p. 175° C. Further purification of both crops by extraction with boiling water and recrystallization of the insoluble residue from 30 volume of 50 percent methanol yielded about 3.5 g. of pure inosine 2',3',5'-trinitrate of melting point 179° C.; U.V. (in 0.1-N hydrochloric acid) $\lambda_{max}$. 248 nm. ($\epsilon$=11800); $\lambda_{min}$. 223 nm. ($\epsilon$=4800).

EXAMPLE 8

The following ingredients are mixed together and then formed into tablets (diameter 7 mm.), each of which contains:

|  | Mg. |
|---|---|
| Adenosine 5'-nitrate monohydrate | 10.6 |
| Mannitol | 46.4 |
| Corn starch | 0.0 |
| Talc | 2.7 |
| Magnesium stearate | 0.3 |
|  | 100.0 |

EXAMPLE 9

The following ingredients are mixed together and then formed into tablets (diameter 8 mm.), each of which contains:

|  | Mg. |
|---|---|
| Adenosine 5'-nitrate monohydrate | 15.9 |
| Mannitol | 80.6 |
| Corn starch | 42.0 |
| Plasdone | 7.5 |
| Talc | 3.6 |
| Magnesium stearate | 0.4 |
|  | 150.0 |

EXAMPLE 10

An injection solution was prepared containing per ml:

Adenosine 5'-nitrate monohydrate, 2.12 mg.
Sodium chloride, quantum satis ad $\Delta T$=—0.56°
Aqua dest. ad 1 ml.

What is claimed is:
1. A compound of the formula

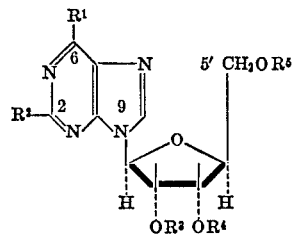

wherein $R^1$ is hydroxy or amino, $R^2$ is hydrogen or amino, $R^3$ is hydrogen or nitro, $R^4$ is hydrogen, nitro or phosphono and $R^5$ is hydrogen, nitro or phosphono, provided that at least one of $R^3$, $R^4$ and $R^5$ represents nitro.

2. A compound of claim 1 wherein $R^1$ is amino and $R^2$ is hydrogen.

3. The compound of claim 2 which is adenosine 3',5'-dinitrate.

4. The compound of claim 2 which is adenosine 5'-nitrate.

5. The compound of claim 2 which is adenosine 2',3',5'-trinitrate.

6. The compound of claim 2 which is adenosine 3'-nitrate 5'-phosphate.

7. The compound of claim 2 which is adenosine 3'-phosphate mononitrate.

8. The compound of claim 2 which is adenosine 2',5'-dinitrate 3'-phosphate.

9. The compound of claim 1 wherein $R^1$ is hydroxy and $R^2$ is amino.

10. The compound of claim 9 which is guanosine 5'-nitrate.

11. The compound of claim 9 which is guanosine 2' or 3'-nitrate.

12. The compound of claim 9 which is guanosine 3',5'-dinitrate.

13. The compound of claim 1 wherein $R^1$ is hydroxy and $R^2$ is hydrogen.

14. The compound of claim 13 which is inosine 2',3',5'-trinitrate.

References Cited
UNITED STATES PATENTS

| 2,039,045 | 4/1936 | Wyler | 260—235 R |
| 2,400,287 | 5/1946 | Caesar | 260—235 R |
| 2,897,194 | 7/1959 | Novak | 260—235 R |
| 3,471,472 | 10/1969 | Thiel et al. | 260—211.5 R |
| 3,590,029 | 6/1971 | Koch et al. | 260—211.5 R |
| 3,595,853 | 7/1971 | Kanal et al. | 260—211.5 R |

JOHNNIE R. BROWN, Primary Examiner

U.S. Cl. X.R.

424—180